United States Patent [19]

Kiuchi

[11] 4,275,281

[45] Jun. 23, 1981

[54] APPARATUS FOR HEATING AN ELECTRICALLY CONDUCTIVE COOKING UTENSIL BY MAGNETIC INDUCTION

[76] Inventor: Mitsuyuki Kiuchi, c/o Matsushita Electric Industrial Company, Ltd., No. 1006, Oaza Kadoma, Kadoma City, Osaka, Japan

[21] Appl. No.: 963,227

[22] Filed: Nov. 24, 1978

Related U.S. Application Data

[60] Continuation of Ser. No. 783,701, Apr. 1, 1977, abandoned, which is a division of Ser. No. 577,156, May 14, 1975, abandoned.

[30] Foreign Application Priority Data

| May 17, 1974 | [JP] | Japan | 49-55890 |
| May 17, 1974 | [JP] | Japan | 49-55891 |
| May 17, 1974 | [JP] | Japan | 49-55893 |

[51] Int. Cl.³ ......................... H05B 6/06; H05B 6/12
[52] U.S. Cl. ......................... 219/10.49 R; 219/10.77; 363/96; 363/135
[58] Field of Search ............. 219/10.49 R, 10.77; 363/19, 37, 85, 86, 89, 96, 97, 124, 135; 307/252 H, 252 N

[56] References Cited

U.S. PATENT DOCUMENTS

| 3,596,165 | 7/1971 | Andrews | 363/19 |
| 3,700,933 | 10/1972 | Harkenrider et al. | 219/501 X |
| 3,775,577 | 11/1973 | Peters, Jr. | 219/10.77 X |
| 3,790,735 | 2/1974 | Peters, Jr. | 219/10.49 |
| 3,806,688 | 4/1974 | Mackenzie et al. | 219/10.77 X |
| 3,823,296 | 7/1974 | Amagami et al. | 219/10.77 |
| 3,823,297 | 7/1974 | Cunningham | 219/10.77 |
| 3,886,342 | 5/1975 | Peters, Jr. | 219/10.72 X |
| 4,010,342 | 3/1977 | Austin | 219/10.77 X |
| 4,016,390 | 4/1977 | Amagami et al. | 219/10.49 |
| 4,016,392 | 4/1977 | Kobayashi et al. | 219/10.49 |

Primary Examiner—Gene Z. Rubinson
Assistant Examiner—Philip H. Leung
Attorney, Agent, or Firm—Robert E. Burns; Emmanuel J. Lobato; Bruce L. Adams

[57] ABSTRACT

An induction heating apparatus having a heating unit with a plurality of parallel heater coils. A low-frequency a.c. power source provides the power which is converted by a static power converter into a high-frequency power applied to the heater coils to produce time-varying magnetic fields. The converter has a switching circuit connected in parallel with the heating unit and said power source for developing the high-frequency power with a frequency substantially equal to a frequency with which the switching circuit is triggered. Control circuitry provides a reference voltage generator and current detector for developing a voltage representative of the current flowing through the heater coils. A single comparator is connected to the reference voltage regulator and the current detector for producing an ON signal when the voltage from the current detector is lower than the reference voltage of the reference voltage generator and for producing an OFF signal when the voltage from the current detector exceeds the reference voltage. A pulse generator is connected to the comparator for producing pulses when receiving the ON signal and ceases to produce pulses when receiving the OFF signal. A pulse supply circuit applies the pulses from the pulse generator to the switching circuit to trigger it in response to the pulses.

4 Claims, 5 Drawing Figures

APPARATUS FOR HEATING AN ELECTRICALLY CONDUCTIVE COOKING UTENSIL BY MAGNETIC INDUCTION

This application is a continuation of application Ser. No. 783,701 filed Apr. 1, 1977, now abandoned, and which is a divisional application of our application Ser. No. 577,156 filed on May 14, 1975 and now abandoned.

BACKGROUND OF THE INVENTION

The present invention relates to an induction heating apparatus which may be used as a cooking device.

The induction heating apparatus generally comprises a static power converter for converting low-frequency power into high-frequency power and at least one heater coil which is arranged to be energized by the high-frequency power. When the induction heating apparatus is used as a cooking device and is subjected to a load such as a cooking pan placed in the vicinity of the heater coil, the impedance of the circuit including the heater coil varies in a broad range in dependence upon the material forming the load. This results in serious fluctuations in the operating conditions of the heater coil and the converter. The fluctuations in the operating conditions of the power converter and the heater coil are, furthermore, caused by an unusual change in the current or the voltage applied to the heater coil and, in the result, tend to invite an over-current through the heater coil and burn-out of the heater coil and destroy insulating materials incorporated into the heating unit.

SUMMARY OF THE INVENTION

It is according a primary object of the present invention to provide an improved induction heating apparatus which includes control means adapted to prevent over-current through the heater coil.

It is another object to provide an improved induction heating apparatus which can prevent over-current through the heating unit even when the heating unit is composed of a plurality of heater coils.

DESCRIPTION OF THE PREFERRED EMBODIMENTS

Figure 1:
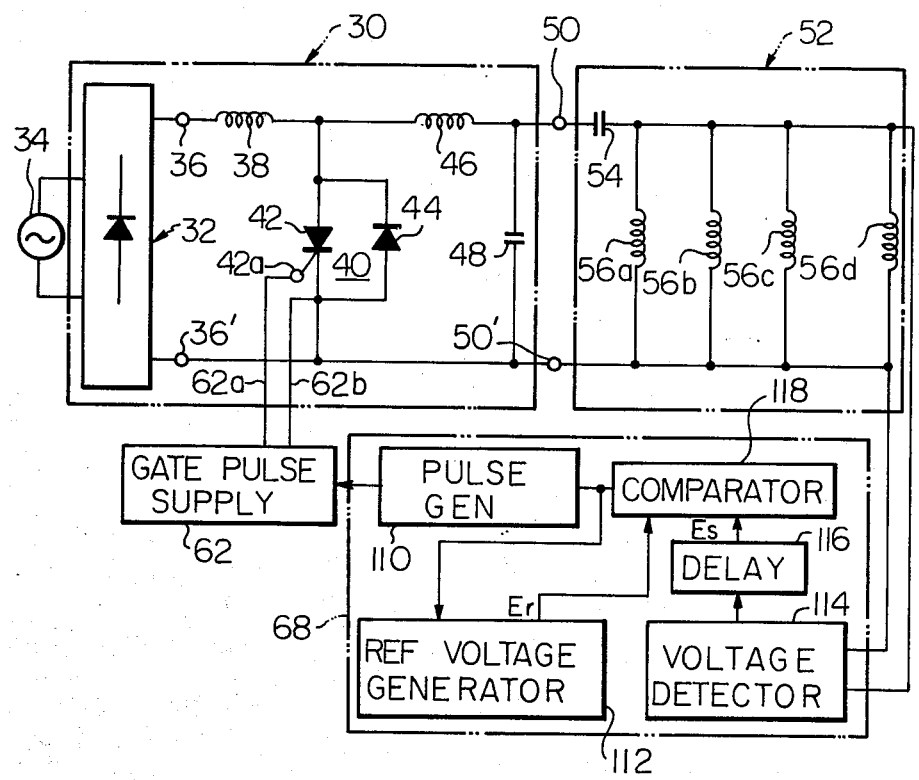
FIG. 1 is a schematic block diagram of an embodiment of the present invention.

Reference will now be made to the drawings, first to FIG. 1 which illustrates a fundamental circuit arrangement of an induction heating apparatus according to the present invention. The induction heating apparatus comprises a static power converter 30 including a rectifier unit 32 connected to a low-frequency a.c. power source 34 and having positive and negative output terminals 36 and 36'. Between the terminals 36 and 36' is connected to a series combination of a current-limiting inductor 38 and a semiconductor switching circuit 40 consisting of a parallel combination of a silicon controlled rectifier 42 and a diode 44 which are connected in opposite directions to each other. Across the switching circuit 40 thus composed of the silicon controlled rectifier 42 and the diode 44 is connected a series combination of a commutating inductor 46 and a commutating capacitor 48 which constitute a resonance circuit together with the succeeding stage thereof, that is, an induction heating unit 52.

The static power converter 30 thus arranged has positive and negative output terminals 50 and 50' to which an induction heating unit 52 is connected. The induction heating unit 52 includes a filter capacitor 54 and a plurality of heating units 56a, 56b, 56c and 56d connected in parallel through the capacitor 54 to the terminals 50 and 50'. The filter capacitor 54 shuts off the direct current component and allows only oscillating current to flow into the coils 56a, 56b, 56c and 56d. A material or load to be heated, herein assumed to be a cooking pan is located in close proximity to one of the heater coils. Although the heating unit 52 is herein shown to consist of a plurality of heater coils this is merely by way of example and the induction heating unit 52 may consist of only one heating coil. The silicon controlled rectifier 42 is cyclically triggered through its gate terminal 42a and lines 62a and 62b by trigger pulses supplied from a gate pulse supply circuit 62. The gate pulse supply circuit 62 is adapted to produce the trigger pulses in response to pulses from a pulse generator 110 of a control circuit 68. The control circuit 68 further includes a reference voltage generator 112 which produces a reference voltage Er on its output terminal, the reference voltage generator varying the reference voltage Er in response to its input voltage. The reference voltage Er is equal to a higher voltage $E_1$ when the input voltage is kept at a lower voltage and to a lower voltage $E_2$ when the input voltage to the generator 112 rises to a higher level. A voltage detector 114 produces an output voltage representative of a voltage across the parallel connection of the heater coils 56a, 56b, 56c and 56d. The output voltage is applied through a delay circuit 116 to a comparator 118 as a voltage Es. The comparator 118 is adapted to produce an ON signal, that is, the higher voltage when the voltage Es is lower than the voltage Er. When the voltage Es exceeds the voltage Er, the comparator 118 produces on its output terminal an OFF signal, that is, the lower voltage.

In operation, the gate pulse supply circuit 62 is controlled by the control circuit 68 so as to produce trigger pulses as long as the voltage across the heater coils 56a, 56b, 56c and 56d is in a normal range. Due to high-frequency switching operation of the switching circuit 40, the d.c. power from the rectifier 32 is converted into the high-frequency a.c. power which is supplied through the output terminals 50 and 50' to the heating unit 52.

When the voltage across the heater coils rises to an abnormally high level, the voltage Es exceeds the reference voltage Er, so that the comparator produces the OFF signal and the pulse generator 110 ceases to supply control pulses to the gate pulse supply circuit. Thus, no power is supplied to the heating unit 52 and accordingly, the voltage Es slowly decreases. The voltage Er, on the other hand, is equal to the lower voltage $E_2$. When the voltage Es lowers below the lower voltage $E_r$, the comparator again produces the ON signal. In case any abnormally high voltage is removed during the stoppage of switching operation of the switching circuit 40, the overall apparatus continues usual operation.

Figure 2:
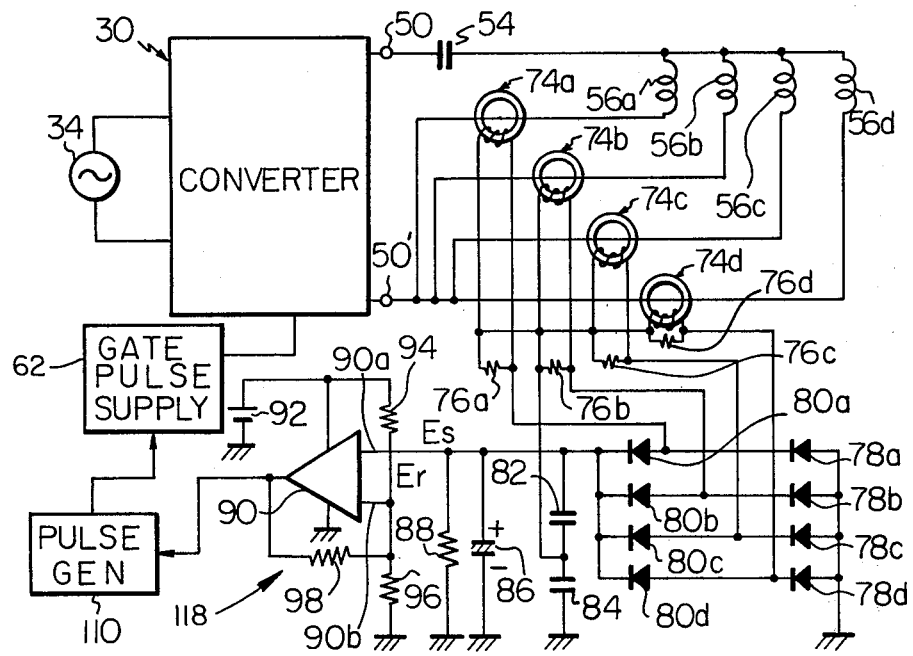
FIG. 2 is a schematic block diagram of another embodiment of the present invention.

In FIG. 2, there is shown a concrete circuit arrangement of the apparatus illustrated in FIG. 1, wherein a current detecting circuit is provided instead of the voltage detector 114. The current detecting circuit comprises current detectors 74a, 74b, 74c and 74d respectively consisting of magnetic cores each linked with the line connected to each heater coil and windings respectively engaged with the magnetic cores for producing a current proportional to the current flowing through the associated heater coils. Resistors 76a, 76b, 76c and 76d are connected in parallel with the windings, for preventing the respective magnetic cores from being saturated. When a current is induced in the winding of each of the current detectors 74a, 74b, 74c and 74d, a voltage proportional to the current is produced across each of the resistors 76a, 76b, 76c and 76d. The voltage developed across each of the resistors is thus indicative of the current flowing through the associated heater coil. The current detecting circuit further comprises first diodes 78a, 78b, 78c and 78d having anode terminal connected to the ground and second diodes 80a, 80b, 80c and 80d having anode terminals respectively connected to the cathode terminals of the first diodes 78a, 78b, 78c and 78d. Each of the second diodes 80a, 80b and 80c and 80d is further connected to one end of each of the resistors 76a, 76b, 76c and 76d of the above mentioned current detectors 74a, 74b, 74c and 74d, respectively. The second diodes 80a, 80b, 80c and 80d have cathode terminals commonly connected to a voltage doubling circuit consisting of a series combination of first and second capacitors 82 and 84. The resistors 76a, 76b, 76c and 76d are connected at the other ends thereof to the node between the capacitors 82 and 84 through a common line. The voltage doubling circuit thus arranged has an output terminal connected to a delay circuit consisting of a parallel combination of a capacitor 86 and a resistor 88. The comparator 118 includes an operational amplifier 90 having first and second input terminals 90a and 90b. The first input terminal 90a of the operational amplifier 90 is connected to the output terminal of the above mentioned delay circuit consisting of the capacitor 86 and the resistor 88. The second input terminal 90b of the operational amplifier 90 is connected across a d.c. power source 92 through voltage dividing resistors 94 and 96. The operational amplifier 90 has an output terminal connected on one hand to the input terminal of the previously mentioned pulse generator 110 and on the other hand to the first input terminal 90b of the operational amplifier 90 through a positive feedback resistor 98. The reference voltage Er dictated by the resistors 94, 96 and 98 is thus impressed on the second input terminal 90b of the operational amplifier 90, the reference potential Er being shifted between the higher voltage $E_1$ and the low voltage $E_2$ depending upon the output signal of the operational amplifier.

When, now, the power converter 30 is switched in with no load applied to each of the heater coils 56a, 56b, 56c and 56d of the heating unit 52, an oscillating current flows through each of the heater coils. The oscillating current thus produced in each heater coil is detected by each of the current detecting means 74a, 74b, 74c and 74d so that a current proportional to the oscillating current in the heater coil is induced in the winding of each current detecting means. A voltage proportional to the current induced in the winding of each of the current detecting means 74a, 74b, 74c and 74d is therefore developed across each of the resistors 76a, 76b, 76c and 76d. Because, in this instance, the respective circuit sections associated with the heater coils 56a, 56b, 56c and 56d operate essentially similarly to each other, the operation of only the circuit section associated with the heater coil 56a will be hereinafter discussed for simplicity of description. When a current flows in one direction through the resistor 76a with a negative potential developed at that end of the resistor 76a which is connected to the voltage doubling circuit, the capacitor 84 forming part of the voltage doubling circuit is charged through the first diode 78a, and, when the direction of the current through the resistor 76a is inversed with a positive potential developed at the above mentioned end of the resistor 76a, the capacitor 82 of the voltage doubling circuit is charged through the second diode 80a with the charges on the capacitor 84 maintained unchanged. The charges thus stored in the capacitors 82 and 84 constituting the voltage doubling circuit are transferred to the delay or timing capacitor 86 so that a potential Es substantially proportional to the current flowing through the heater element 56a appears at the output terminal of the delay circuit and is impressed on the first input terminal 90a of the operational amplifier 90. An example of the waveform of the potential Es thus appearing at the first input terminal 90a of the operational amplifier 90 is demonstrated in FIG. 3b.

Figure 3A:
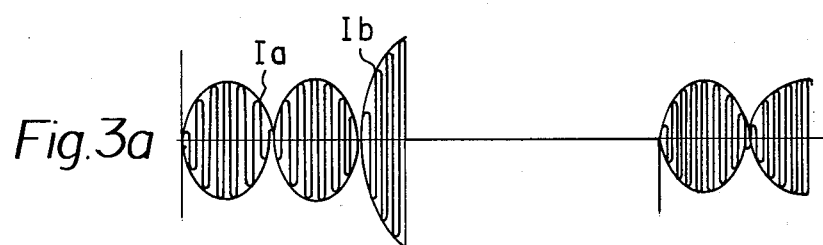
FIGS. 3a, 3b and 3c illustrate waveforms of signals appearing in the apparatus shown in FIG. 2.
Figure 3B:
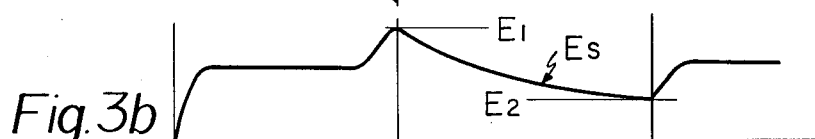

When the heater coil 56a is held in a normal loaded condition, the current flowing therethrough has a relatively small magnitude as indicated at Ia in FIG. 3a and consequently the potential Es impressed on the first input terminal 90a of the operational amplifier 90 is lower than the previously mentioned initial level $E_1$ dictated by the resistors 94, 96 and 98. The operational amplifier 90 is therefore caused to produce a logic "1" output signal in the form of a fixed positive potential as indicated by $S_1$. Under these conditions, the gate pulse supply circuit 62 allowed to trigger the silicon controlled rectifier 42 of the switching circuit 40 at a predetermined normal frequency so that the converter 30 will continue to operate in a steady-state condition.

Figure 3C:
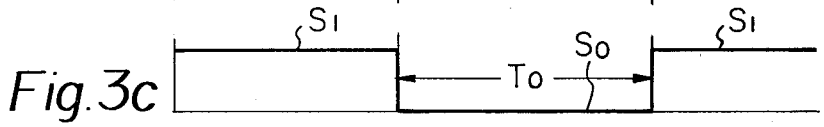

When, however, the heater coil 56a is subjected to an over-load, the current flowing through the heater coil 56a is augmented as indicated at Ib in FIG. 3a, so that the potential developed at the first input terminal 90a of the operational amplifier 90 increases and will reach the above mentioned level $E_1$ appearing at the second input terminal 90b of the operational amplifier 90. As a consequence, the operational amplifier 90 delivers a logic "0" output signal, that is, the above-mentioned OFF signal which is in the form of a zero potential indicated by So in FIG. 3, causing the gate pulse supply circuit 62 to cease the delivery of the trigger pulses to the silicon controlled rectifier 42 of the switching circuit 40 and thereby shutting off the converter 30. In the presence of the zero potential at the output terminal of the operational amplifier 90, the positive feedback resistor 98 is maintained in a condition connected in parallel to the voltage dividing resistor 96 with the result that the potential appearing at the second input terminal 90b of the operational amplifier 90 drops from the level $E_1$ to the level $E_2$. The charges which have been stored in the delay or timing capacitor 86 are released to ground through the resistor 88. When the voltage across the capacitor 86, viz., the potential Es appearing at the first input terminal 90a of the operational amplifier 90 reaches the above mentioned level $E_2$ of the reference potential Er, then the operational amplifier 90 is caused to deliver the logic "1" output signal or the fixed positive potential as indicated by $S_1$, in FIG. 3, permitting the gate pulse supply circuit 62 to trigger the silicon controlled rectifier 42 of the switching circuit 40 in normal conditions. If, under these conditions, the current flowing through the heater coil 56a is found to be still maintained at a relatively high level and as a consequence the potential Es representative of the magnitude of the current is higher than the level $E_1$ of the reference potential Er, the converter 30 will be disabled until the potential Es developed at the first input terminal 90a of the amplifier 90 is diminished to the level $E_2$. The period of time for which the converter 30 is maintained inoperative is dictated by the time duration $T_o$ of the logic "0" signal and thus corresponds to the period of time for which the capacitor 86 is allowed to be discharged. The time duration $T_o$ can be adjusted by varying the levels $E_1$ and $E_2$ of the reference potential Er to be impressed on the second input terminal 90b of the operational amplifier 90 or, in other words, by selecting the resistance values of the resistors 94, 96 and 98 connected to the operational amplifier 90.

Although description has been directed only at the operation of the circuit section associated with the heater coil 56a, such description applies also to the operation of any of the circuit sections associated with the other heater coils 56b, 56c and 56d because the voltage across the capacitor 86 forming part of the delay circuit 86 increases if an over-current flows through at least one of the heater coils 56a, 56b, 56c and 56d. When, thus, the voltage across the capacitor 86 exceeds the previously mentioned level $E_1$ responsive to an over-current flowing through at least one of the heater coils 56a, 56b, 56c and 56d, the power converter 30 is disabled from delivering an oscillation current to the heating unit 52 even though the current flowing through each of the remaining heater coils is maintained on a level such that the voltage Er resulting from the current is lower than the level $E_1$.

What is claimed is:

1. An induction heating apparatus comprising:

a heating unit including a plurality of heater coils connected with each other in parallel;

a static power converter connected between said heating unit and a low-frequency a.c. power source for converting the low-frequency power into a high-frequency power and supplying said high-frequency power to said heating unit thereby causing said heater coils to produce time-varying magnetic fields, said converter including a switching circuit connected in parallel with said heating unit and said power source for producing said high-frequency power with a frequency substantially equal to a frequency with which the switching circuit is triggered; and control means including a reference voltage generator, a current detector for producing a voltage representative of current flowing through said heater coils, said current detector comprising magnetic cores respectively linked with lines connected to said heater coils, a plurality of windings each comprising turns wound on a corresponding one of said magnetic cores, a rectifier connected to said windings, and a timing capacitor connected to said rectifier for storing said voltage across said timing capacitor, a single comparator connected to said reference voltage generator and current detector for producing an ON signal when the voltage from said current detector is lower than the reference voltage of said reference voltage generator and for producing an OFF signal when the voltage from said current detector exceeds the reference voltage, a pulse generator connected to said comparator for producing pulses when receiving said ON signal and ceasing to produce pulses when receiving said OFF signal, and a gate pulse supply circuit connected to said pulse generator and said switching circuit for triggering said switching circuit in response to said pulses from said pulse generator.

2. An induction heating apparatus according to claim 1, in which said reference voltage generator includes serially connected two resistors, and a d.c. power source connected across the series connection of said resistors for supplying a constant d.c. voltage to the series connection, whereby the reference voltage appears at a junction of the terminals of said two resistors.

3. An induction heating apparatus according to claim 2, in which said comparator includes an operational amplifier having one input terminal connected to the output terminal of said reference voltage generator and the other input connected to the output of said current detector.

4. An induction heating apparatus according to claim 1, which further comprises a delay circuit connected between the output of said current detector and the input of said comparator, for extending the time of decrease of the output voltage of said current detector.

* * * * *